United States Patent
McNulty et al.

(10) Patent No.: US 6,748,974 B1
(45) Date of Patent: Jun. 15, 2004

(54) MIXING VALVE WITH HYDRAULIC WEAR PLATE

(75) Inventors: John McNulty, Broadview Heights, OH (US); James F. Dempsey, North Olmsted, OH (US); John C. Holzheimer, Burton, OH (US)

(73) Assignee: Moen Incorporated, North Olmsted, OH (US)

( * ) Notice: Subject to any disclaimer, the term of this patent is extended or adjusted under 35 U.S.C. 154(b) by 0 days.

(21) Appl. No.: 10/369,030

(22) Filed: Feb. 17, 2003

Related U.S. Application Data

(63) Continuation of application No. 10/071,642, filed on Feb. 7, 2002, now abandoned.

(51) Int. Cl.[7] ............................................. F16K 11/06
(52) U.S. Cl. ..................... 137/625.41; 137/98
(58) Field of Search ............................ 137/98, 454.6, 137/625.41

(56) References Cited

U.S. PATENT DOCUMENTS

| | | | | |
|---|---|---|---|---|
| 3,923,077 A | * | 12/1975 | Scaglione | ................... 137/546 |
| 4,130,136 A | * | 12/1978 | Garnier et al. | ......... 137/625.41 |
| 5,623,966 A | * | 4/1997 | Rodger | ................... 137/625.32 |
| 6,427,713 B1 | * | 8/2002 | Dempsey et al. | ...... 137/625.41 |

* cited by examiner

Primary Examiner—John Fox
(74) Attorney, Agent, or Firm—Calfee, Halter & Griswold LLP

(57) ABSTRACT

A valve assembly for mixing hot and cold water includes a rotable non-reciprocal valve member positioned therein to control the mixture of hot and cold water in the outlet stream. The valve member has a hollow stem tube having hot and cold inlet and outlet ports which are rotably engageable with the hot and cold inlets and outlets of the sleeve. The stem tube includes at least one wear plate receiving area for receiving at least one wear plate. The wear plate is in fluid communication with at least one of the stem tube hot and cold water inlet and outlet ports. The valve assembly may further include a stem driver which is attached to the stem tube to control rotational movement of the stem tube and a sleeve which receives the stem tube.

14 Claims, 2 Drawing Sheets

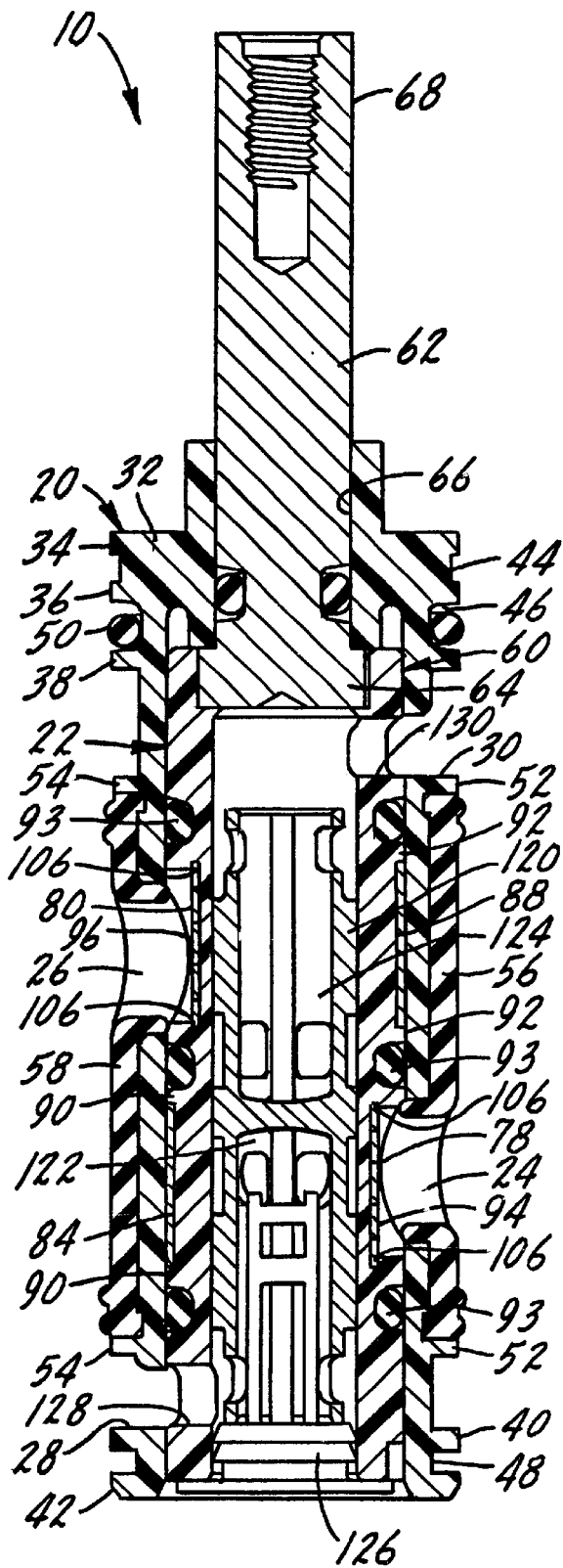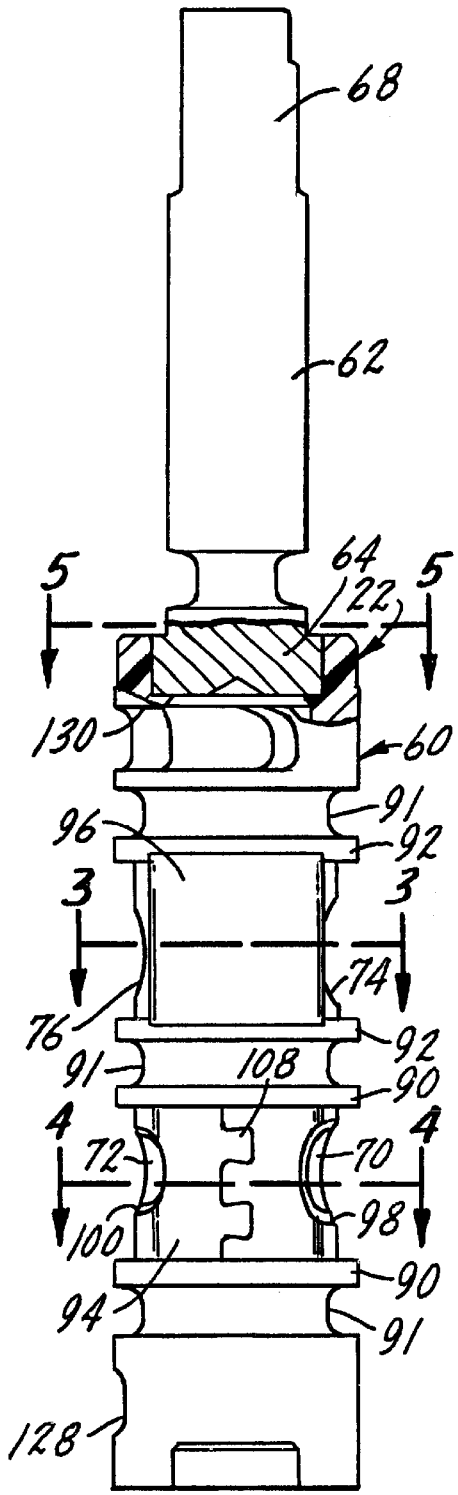

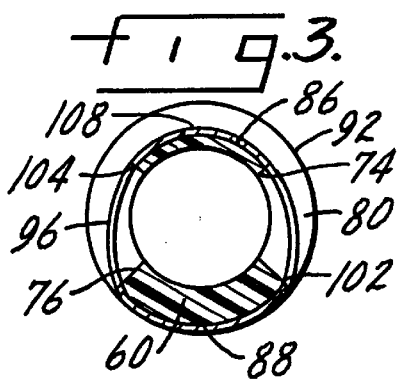
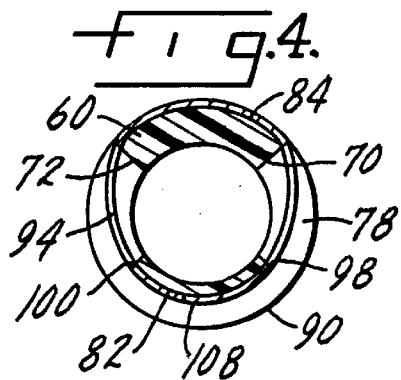
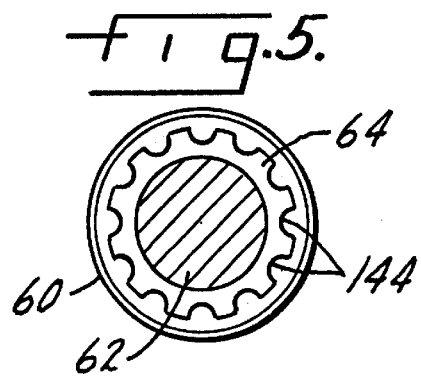
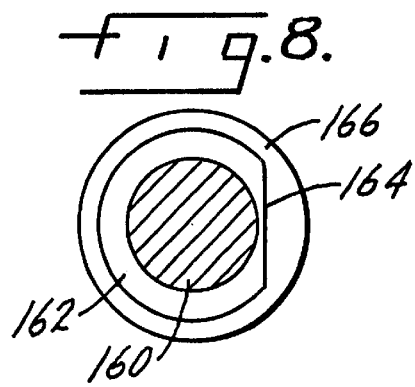
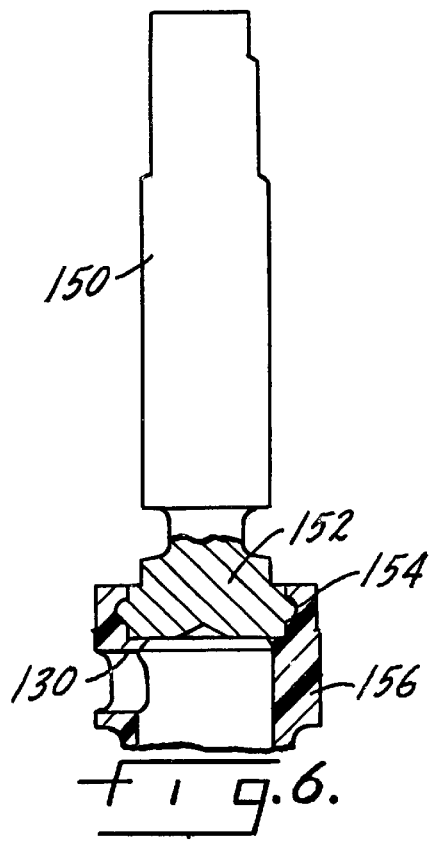
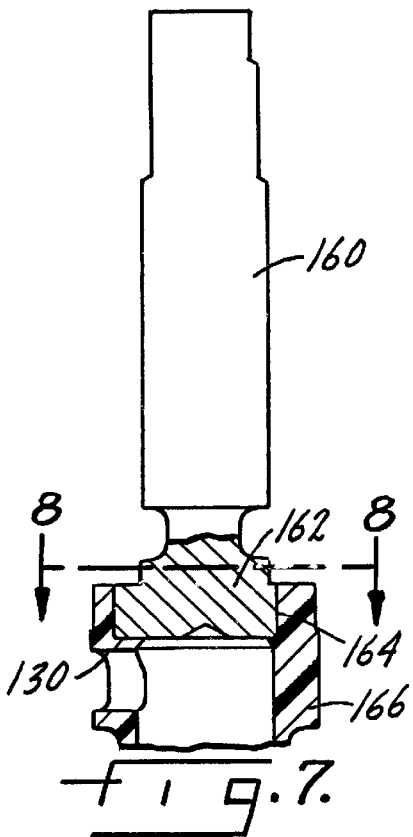

MIXING VALVE WITH HYDRAULIC WEAR PLATE

PRIORITY CLAIM

This is a continuation application of U.S. application Ser. No. 10/071,642, which was filed on Feb. 7, 2002 now abandoned.

FIELD OF THE INVENTION

The present invention relates to mixing valves, particularly mixing valves for kitchen or bath sinks, showerheads, tub spouts and shower-tub combinations. Current mixing valves provide a valve control member with regulates the temperature of the water. During use, the mixing valve can be rotated by the user from an off position through cold water, mixed water and hot water positions. The rotational position of the valve control member determines how much hot or cold water comprises the water outlet stream.

Mixing valves provide for all cold water, all hot water or mixed temperature watery streams. The mixing valve assembly generally includes a stem tube and a sleeve. During operation, a cold stream is easily obtained by incrementally rotating the stem tube within the sleeve from an off position until a cold water stream is obtained. Cold water flows into the sleeve and the stem tube through the cold water inlet ports and then exits through the cold water outlet port. Similarly a hot water stream is easily obtained by fully rotating the stem tube until the mixing valve can no longer rotate. Hot water flows into the stem tube through the hot water inlet port and then exits the hot water outlet port. A desired mixed temperature stream is obtained by adjusting the rotational position of the stem tube between the all cold water and all hot water stream positions. As hot and cold water exit their respective outlet ports, the water mixes to obtain the desired mixed temperature water stream.

It is important that the stem tube have the desired durability and wear characteristics. The stem tube must withstand the forces and pressure from repetitious use of the mixing valve. As the stem tube is rotated from the off position to a position which achieves the user's desired temperature stream, water impacts the surface of the stem tube and causes wear on the surface thereof. Thus, the stem tube must be made of a durable material which can withstand the flow and pressure of the respective cold, hot and mixed temperature water stream.

Current stem tubes are made primarily of metal which has the desired characteristics to withstand the day-to-day wear which is imposed upon the valve due to water flow and water pressure. The metal is usually formed by metal injection molding or by screw machining. Difficulties in manufacturing metal stem tubes arise due to the precision and accuracy which is necessary to size and locate the openings for the hot and cold inlet ports and outlet ports. The openings must be formed within precise tolerances to ensure alignment with openings of the sleeve and the inlet and outlet ports within a valve housing which supplies and carries away the water for use.

Another concern with existing stem tubes is the importance of ensuring a secure interface between the stem tube and a stem driver which allows the user to control rotation of the stem tube. The stem tube and stem driver interface should withstand torsional forces over the average life of the mixing valve. Also, the stem tube and stem driver interface should be capable of maintaining a secure connection despite the site being subject to corrosion.

The present invention provides for a mixing valve which includes wear plates in fluid communication with at least one of the stem tube inlet and outlet ports. The present invention provides a stem tube which is manufactured from non-metallic material and further provides for an improved attachment between the stem tube and the stem driver.

SUMMARY OF THE INVENTION

The mixing valve of the present invention includes a valve member for a valve assembly for mixing hot and cold water. The valve member includes a stem tube having hot and cold water inlet and outlet ports. The stem tube includes at least one wear plate receiving area which receives a wear plate. The wear plate is circumferentially positioned around the wear plate receiving area and generally matches the circumference of the wear plate receiving area. The wear plate is in fluid communication with at least one of the stem tube hot and cold water inlet and outlet ports.

For example, one wear plate may be circumferentially located on the stem tube near the stem tube hot water inlet ports and another wear plate may be circumferentially located near the stem tube cold water inlet ports. The wear plate includes openings which correspond to the hot and cold water inlet ports, as necessary. Ribs, notches and recessed areas of the stem tube assist in securing the wear plate against rotational and axial movement in relation to the stem tube. The stem tube is made of a non-metallic material such as plastic whereas the wear plate is made of metal. The wear plate may be attached to the stem tube during molding of the stem tube.

The stem tube is attached to a stem driver. A base of the stem driver can be attached to the stem tube during molding or other suitable methods. The shape of the stem driver base may be varied incorporating serrations, an annular skirt or a swaging portion.

BRIEF DESCRIPTION OF THE DRAWINGS

FIG. 1 is an axial section of the valve assembly.

FIG. 2 is a partial sectional view of the valve assembly, as viewed from the left side of FIG. 1, with portions of the valve assembly removed.

FIG. 3 is a section taken along line 3—3 of FIG. 2.

FIG. 4 is a section taken along line 4—4 of FIG. 2.

FIG. 5 is section taken along line 5—5 of FIG. 2.

FIG. 6 is a partial section, similar to FIG. 2, showing an alternate connection between the stem tube and the stem driver.

FIG. 7 is a partial section, similar to FIG. 2, showing another alternate connection between the stem tube and the stem driver.

FIG. 8 is section taken along line 8—8 of FIG. 7.

DETAILED DESCRIPTION OF THE INVENTION

As illustrated in FIG. 1, the present invention includes a mixing valve assembly 10. The mixing valve assembly is insertable into a valve housing with cold and hot water inlet ports. The valve housing may be similar to the valve housing described in U.S. Pat. No. 4,469,121 or, alternatively, described in pending U.S. patent application Ser. No. 09/825,701, which are incorporated herein by reference, assigned to Moen Incorporated and sold under the trademark Posi-Temp®. The valve assembly 10 includes a generally cylindrical sleeve 20 and a rotatable non-reciprocal valve member 22 positioned therein. The sleeve 20 has a cold water inlet port 24 and a hot water inlet port 26 which are axially spaced and radially non-aligned. A cold water outlet port 28 and a hot water outlet port 30 are radially non-aligned and are peripherally located from the sleeve cold and hot inlets 24, 26. The sleeve inlet and outlet ports may have any shape or size. An outer surface 32 of the sleeve may have a plurality of rims 34, 36, 38, 40, 42 and grooves 44, 46, 48. Some of the grooves may receive a corresponding seal ring 50. Raised edges 52, 54 extend around the periphery of a corresponding valve seal 56, 58.

In FIGS. 1–2 the valve member 22 has a hollow stem tube 60 and a stem driver 62, with the stem tube being attached to the stem driver. As shown in FIG. 1, a cylindrical base 64 of the stem driver 62 is seated within a portion of the hollow stem tube 60. The stem driver 62 protrudes out of a sleeve opening 66 when the valve assembly is positioned therein. The stem driver may have one or more annular grooves to receive seal rings. A protruding end portion 68 of the stem driver 62 may have one or more flattened areas and a threaded area located therein which will conventionally mount a decorative operating knob (not shown).

The stem tube 60 is hollow and has cold water inlet ports 70, 72 and hot water inlet ports 74, 76. The surface of the stem tube 60 includes at least one wear plate receiving area. In FIGS. 1 and 2, one wear plate receiving area 78 is circumferentially located near the stem tube cold water inlet ports 70, 72. A second wear plate receiving area 80 is circumferentially located near the stem tube hot water inlet ports 74, 76. Each wear plate receiving area 78, 80 generally defines a recessed surface with gradually changing depth. As shown in FIG. 4, the wear plate receiving area 78 has a large recessed portion 82 which extends approximately 270° around the circumference of the stem tube. The large recessed portion 82 tapers to join a small recessed portion 84. Similarly in FIG. 3 the wear plate receiving area 80 has a large recessed portion 86 and a small recessed portion 88. The wear plate receiving area 78 associated with the cold water inlet ports 70, 72 is axially bounded by ribs 90 on both sides. Likewise, the wear plate receiving area 80 associated with the hot water inlet ports 74, 76 is axially adjoined by ribs 92 on both sides. Grooves 91 may be located along the stem tube for receiving seals 93.

As shown in FIGS. 1–4, wear plates 94, 96, respectively, are circumferentially positioned on the corresponding wear plate receiving areas 78, 80 of the stem tube 60 and generally matches the shape thereof. In FIG. 4 the wear plate 94 which overlaps the wear plate receiving area 78 has openings 98, 100 which correspond to the cold water inlet ports 70, 72, respectively. In FIG. 3 the wear plate 96 which overlaps the wear plate receiving area 80 has openings 102, 104 which correspond to the hot water inlet ports 74, 76, respectively. As shown in FIG. 1, a portion of each wear plate 94, 96 is received within the corresponding large recessed portion 82, 86 and the exterior surface of the wear plate 94, 96 is offset from the corresponding ribs 90, 92. The outer circumferential edge of each wear plate 94, 96, is received within a corresponding notch 106 of the wear plate receiving area 78, 80. The notches 106 extend substantially along the length of each large recessed portion 82, 86. The remaining portion of the wear plate that is not received within the notches 106 is received within the small recessed portions 84, 88, as shown in FIGS. 1, 3 and 4. Adjacent the small recessed portions 84, 88, the exterior surface of each wear plate 94, 96 is substantially axially aligned with the corresponding ribs 90, 92. Each wear plate may secured at a butterfly seam, indicated at 108.

When the wear plate 94 is disposed on the wear plate receiving area 78, it is in fluid communication with the stem tube cold water inlet ports 70, 72. Likewise, when the wear plate 96 is disposed on the wear plate receiving area 80, it is in fluid communication with the stem tube hot water inlet ports 74, 76. As cold water flows to the cold water inlet ports 70, 72, it passes over the wear plate 94. Similarly, as hot water flows to the hot water inlet ports 74, 76, it passes over the wear plate 96. Impact from hydraulic forces and pressure is substantially focused or absorbed by the wear plate. The surfaces of the stem tube and wear plate are smooth in order to minimize flow losses and improve the flow of water through the stem tube. The wear plate is attached to the stem tube and fixed from rotational and axial movement with respect to the stem tube 60. The wear plate is fully integrated with the stem tube causing unitary movement of the stem tube and the wear plate.

As shown in FIG. 1, there is a reciprocally movable pressure balancing spool 120 positioned within the hollow stem tube 60. The spool 120 defines a cold water chamber 122 and a hot water chamber 124 with each of the chambers having corresponding openings for the entry and exit of water. The balancing spool 120 is reciprocally movable in response to differing pressure at the cold and hot water inlets thereby maintaining equal pressure between the stem tube hot and cold water outlets. A plug member 126 fits into the stem tube opposite the stem driver 62 to hold the spool 120 within the stem tube 60.

The stem tube 60 includes a cold water outlet port 128 and a hot water outlet port 130. It will be understood that during rotation of the valve assembly, the stem tube cold outlet port 128 can be moved into register with the sleeve cold outlet port 28 and the stem tube hot outlet port 130 can similarly be moved into register with the sleeve hot outlet port 30. The stem tube 60 is rotable within the sleeve 20, but is fixed against reciprocal movement on one end of the stem tube by the sleeve and on the other end by the valve housing (not shown). Thus, the valve is rotable but not reciprocal. Rotable movement, as described above, permits the valve assembly to control the temperature of the resulting water stream.

When the valve is closed, the stem tube inlet ports 70, 72, 74, 76 are not in fluid communication with the sleeve inlets 24, 26 and the stem tube outlet ports 128, 130 are not in fluid communication with the sleeve outlets 28, 30. Opening of the valve occurs when the stem driver 62 is rotated in a conventionally counterclockwise direction. When the valve is opened, the cold water inlet port 70 is moved into register with the sleeve cold water inlet port 24 and the hot water inlet port 76 is moved into register with the sleeve hot water inlet port 26. During rotation of the valve assembly, cold water is permitted to flow through both inlet ports 70, 72 because of the large recessed portion 82. The wear plate 94 protects the underlying surface of the stem tube 60 from wearing forces due to cold water flow and pressure. Similarly, when the stem tube hot water inlet port 76 is moved into register with the sleeve hot water inlet 26, hot water is permitted to flow through both inlet ports 74, 76 due to the large recessed portion 86. The wear plate 96 protects the stem tube 60 from hydraulic forces impacting the stem tube at the hot water inlet ports 74, 76.

Opening of the valve permits fluid communication between the stem tube 60 and the sleeve 20 as cold and hot water flows through the respective sleeve and stem tube inlets into the respective cold and hot water chambers 122, 124. Upon continued rotation, the stem tube cold water outlet port 128 is moved into fluid engagement with the sleeve cold water outlet 28 to provide a cold water outflow from the mixing valve. Continued rotation of the valve, allows the stem tube hot water outlet port 130 to be in fluid communication with the sleeve hot water outlet 30. Hot water mixes with cold water outside the sleeve to provide an outlet stream which has a mixed water temperature. After a predetermined amount of counterclockwise rotation, the stem tube cold water outlet port 128 will no longer be in fluid communication with the sleeve cold water outlet 28 whereas the stem tube hot water outlet port 130 will still be in fluid communication with the sleeve hot water outlet 30 thus providing a hot water outlet stream. The valve may be closed upon a reverse clockwise rotation of the valve so as to return the valve to the closed position.

The stem tube 60 is made from a non-metallic material. Examples of stem tube materials include but are not limited to polysulfone. Other materials will be apparent to persons skilled in the art. It is important that the tolerance of the stem tube is maintained at approximately 0.002 inches. Although the stem tube is preferably made from an injection molded process, other processes may be used. The sleeve may also be made from a nonmetallic material using similar manufacturing processes.

The wear plates are important in that they provide a substantially scratch resistant surface. The wear plates are made from stainless steel stampings. The wear plate may be molded from a piece of metal which is formed and secured around the stem tube. During manufacture of the valve assembly, the wear plates 94, 96 are preferably attached to the stem tube 60 during molding of the stem tube. The notches 106 and ribs 90, 92 of the stem tube are formed during molding in order to ensure that the wear plates are fixed from axial and rotational movement. Each wear plate is attached to the stem tube so as to provide a uniform stem tube configuration which is replaceable with existing valve members.

The stem driver and pressure balancing spool are preferably made from metal injection molding processes although other processes such as screw machining or the like may be used. The stem driver and spool may be made from any metallic materials although brass is preferred from the stem driver. The stem driver may be attached to the stem tube by a press fit, molded in during stem tube molding or other known methods. The geometry of the stem driver base may be varied from the cylindrical base 64 shown in FIGS. 1 and 2 to ensure a secure engagement between the stem driver and the stem tube during rotation of the valve.

FIG. 5 shows the stem driver 62 which includes the stem driver base 64 having individual serrations 144. The stem tube 60 is attached to the stem driver base 64 by any appropriate method such as during molding of stem tube. Portions of the stem tube are received within the serrations 144.

FIG. 6 shows an alternate stem driver 150 which includes a stem driver base 152 having an annular skirt 154. A stem tube 156 is axially disposed on both sides of the skirt 152. The stem driver may be mated to the stem tube during molding of the stem tube or other like methods.

FIGS. 7 and 8 show another variation of the stem driver and stem tube interface. A stem driver 160 includes a stem driver base 162. A swaging portion 164 is formed on the stem driver base 162. A stem tube 166 is connected to the stem driver base 162 adjacent the swaging portion 164. So the stem tube 166 is securely connected to the stem driver, 160 and during use of the mixing valve assembly rotational movement of the stem driver is transferred to the stem tube. The stem tube 166 may be attached to the stem driver 160 during molding of the stem tube or other like methods.

Whereas the preferred form of the invention has been shown and described herein, it should be realized that there may be many modifications, substitutions and alterations thereto without departing from the scope of the claims. It is also possible for the wear plate receiving area to be located near the stem tube hot and cold water outlet ports for receiving a corresponding wear plate. Since the wearing action may also occur on the interior surfaces of the stem tube, it is also possible for there to be wear plate receiving areas on the interior surface near one of the stem tube hot and cold water inlet and outlet ports with the wear plate receiving area receiving a respective wear plate.

In addition, any number and orientation of wear plates are possible. A single wear plate may be used which is associated with one or more stem tube inlet or outlet ports. Although the wear plate is positioned circumferentially on the stem tube with corresponding openings for the inlets, other variations are possible. The wear plate may be positioned over a portion of the circumferential stem tube length, or it may be embedded within the stem tube. The wear plate may be comprised of one or more parts which are secured to the stem tube. The wear plate or its parts may be positioned in such a way which avoids the inclusion of corresponding openings for the stem tube inlet and outlet ports.

The stem tube inlet ports 70, 72, 74, 76 may have any opening shape and although the inlet ports are shown with a taper radially inwardly, as shown in FIGS. 3 and 4, other orientations are possible. Likewise, the stem tube outlet ports 128, 130 may have any shape and orientation other than that shown. In addition, variations of the shape of each of the stem tube and sleeve inlet and outlet ports may be made to provide a greater range of mixed temperature water.

What is claimed is:

1. A valve member for a valve assembly for mixing hot and cold water including:
   a rotable non-reciprocal valve member positioned within said valve assembly to control the mixture of hot and cold water, said valve member including a hollow stem tube having hot and cold water inlet and outlet ports therein and a sealless reciprocally movable pressure balancing spool positioned within said stem tube, said stem tube including at least one wear plate receiving area, said spool and stem tube providing two spaced chambers, said stem tube cold water inlet and outlet ports opening into one chamber and said stem tube hot water inlet and outlet ports opening into the other chamber, with a portion of said chamber walls forming balancing surfaces such that said spool provides for balancing of pressures between the hot and cold water inlet ports; and
   at least one wear plate disposed on said at least one wear plate receiving area, said at least one wear plate being in fluid communication with at least one of said stem tube hot and cold water inlet and outlet ports.

2. The valve member of claim 1 wherein said at least one wear plate receiving area is circumferentially disposed on said stem tube.

3. The valve member of claim 1 wherein said wear plate receiving area includes at least one recessed portion.

4. The valve member of claim 1 wherein said wear plate is fixed against axial and rotational movement in relation to the stem tube.

5. The valve assembly of claim 1 wherein said wear plate receiving area includes at least one notch.

6. The valve member of claim 1 wherein said at least one wear plate is positioned on said stem tube adjacent at least one of said stem tube hot and cold water inlet ports.

7. The valve member of claim 1 wherein said at least one wear plate includes openings which correspond to respective stem tube hot and cold water inlet ports.

8. The valve member of claim 1 wherein said stem tube is made of a non-metallic material.

9. The valve member of claim 1 wherein said wear plate is made of metal.

10. The valve member of claim 1 further including a stem driver which controls rotable movement of said stem tube.

11. The valve member of claim 10 wherein said stem driver includes serrations for attachment of said stem driver to said stem tube.

12. The valve member of claim 10 wherein said stem driver includes a swaged portion for attachment of said stem driver to said stem tube.

13. The valve member of claim 10 wherein said stem driver includes an annular skirt for attachment of said stem driver to said stem tube.

14. A valve assembly for mixing hot and cold water including:

a generally cylindrical sleeve having axially spaced and radially non-aligned hot and cold water inlets in the side thereof, axially spaced and radially non-aligned hot and cold outlets in said sleeve located peripherally of said inlets;

a rotable non-reciprocal valve member positioned within said sleeve to control the mixture of hot and cold water, said valve member including a hollow stem tube having hot and cold water inlet and outlet ports therein and a sealless reciprocally movable pressure balancing spool positioned within said stem tube, said stem tube including at least one wear plate receiving area, said spool and stem tube providing two spaced chambers, said stem tube cold water inlet and outlet ports opening into one chamber and said stem tube hot water inlet and outlet ports opening into the other chamber, with a portion of said chamber walls forming balancing surfaces such that said spool provides for balancing of pressures between the hot and cold water inlet ports; and at least one wear plate disposed on said at least one wear plate receiving area, said at least one wear plate being in fluid communication with at least one of said stem tube hot and cold water inlet and outlet ports.

\* \* \* \* \*